United States Patent
Nakano et al.

(10) Patent No.: US 6,728,179 B1
(45) Date of Patent: Apr. 27, 2004

(54) APPARATUS AND METHOD FOR OPTICAL RECORDING/REPRODUCING INFORMATION INCLUDING ELECTRICAL SPHERICAL-ABERRATION CORRECTION MECHANISM HAVING LOW POWER CONSUMPTION

(75) Inventors: Ikuo Nakano, Kashihara (JP); Eiji Yamada, Tenri (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/566,615

(22) Filed: May 9, 2000

(30) Foreign Application Priority Data

May 10, 1999 (JP) .......................................... 11-128091

(51) Int. Cl.[7] ............................................... G11B 7/00
(52) U.S. Cl. .................................. 369/53.1; 369/112.24
(58) Field of Search .......................... 369/53.18, 53.19, 369/53.2, 112.24, 53.1

(56) References Cited

U.S. PATENT DOCUMENTS

| | | | | |
|---|---|---|---|---|
| 4,918,679 A | * | 4/1990 | Opheij et al. ................... | 369/44 |
| 6,097,688 A | * | 8/2000 | Ichimura et al. ........ | 369/112.24 |
| 6,141,302 A | * | 10/2000 | Koyama et al. ........... | 369/44.24 |
| 6,381,208 B1 | * | 4/2002 | Abe et al. ............... | 369/112.01 |
| 6,414,931 B1 | * | 7/2002 | Maeda et al. ........... | 369/112.24 |
| 6,498,775 B1 | * | 12/2002 | Fan et al. ....................... | 369/94 |

FOREIGN PATENT DOCUMENTS

| | | | |
|---|---|---|---|
| JP | 5-266511 | 10/1993 | |
| JP | 10-188301 | 7/1998 | |
| JP | 10-255290 | 9/1998 | |
| WO | WO 00/34949 | * 6/2000 | ............ G11B/7/12 |

OTHER PUBLICATIONS

MAT (Machine assisted translation) JP 10–255290.*

I. Ichimura, et al.; "O plus E"; Sharp; pp. 175–181; vol. 22; No. 2; Feb. 2,000 (with partial English translation).

* cited by examiner

*Primary Examiner*—Aristotelis M Psitos
(74) *Attorney, Agent, or Firm*—David G. Conlin; David A. Tucker; Edwards & Angell, LLP

(57) ABSTRACT

In a spherical-aberration correcting mechanism which electrically drives and changes the lens group gap of two groups of lenses so as to correct spherical aberration, in order to reduce the power consumption thereof, the optical recording/reproducing apparatus of the present invention is arranged so that, upon recording or reproducing a recording medium having a plurality of recording layers, supposing that the gap of the lens groups at the time of forming a converged light spot on the first recording layer is DIS(1), the applied current to the spherical-aberration correcting mechanism is i1, the gap of the lens groups at the time of forming a converged light spot on the N-th layer (the farthest layer from the surface of the recording medium) is DIS(N) and the applied current to the spherical-aberration correction mechanism is i2, |i1|=|i2| is satisfied, and the neutral point of the spherical-aberration correcting mechanism is set at a position satisfying the following expression: lens group gap dst (3)=((DIS(1)+DIS(N))/2.

9 Claims, 12 Drawing Sheets

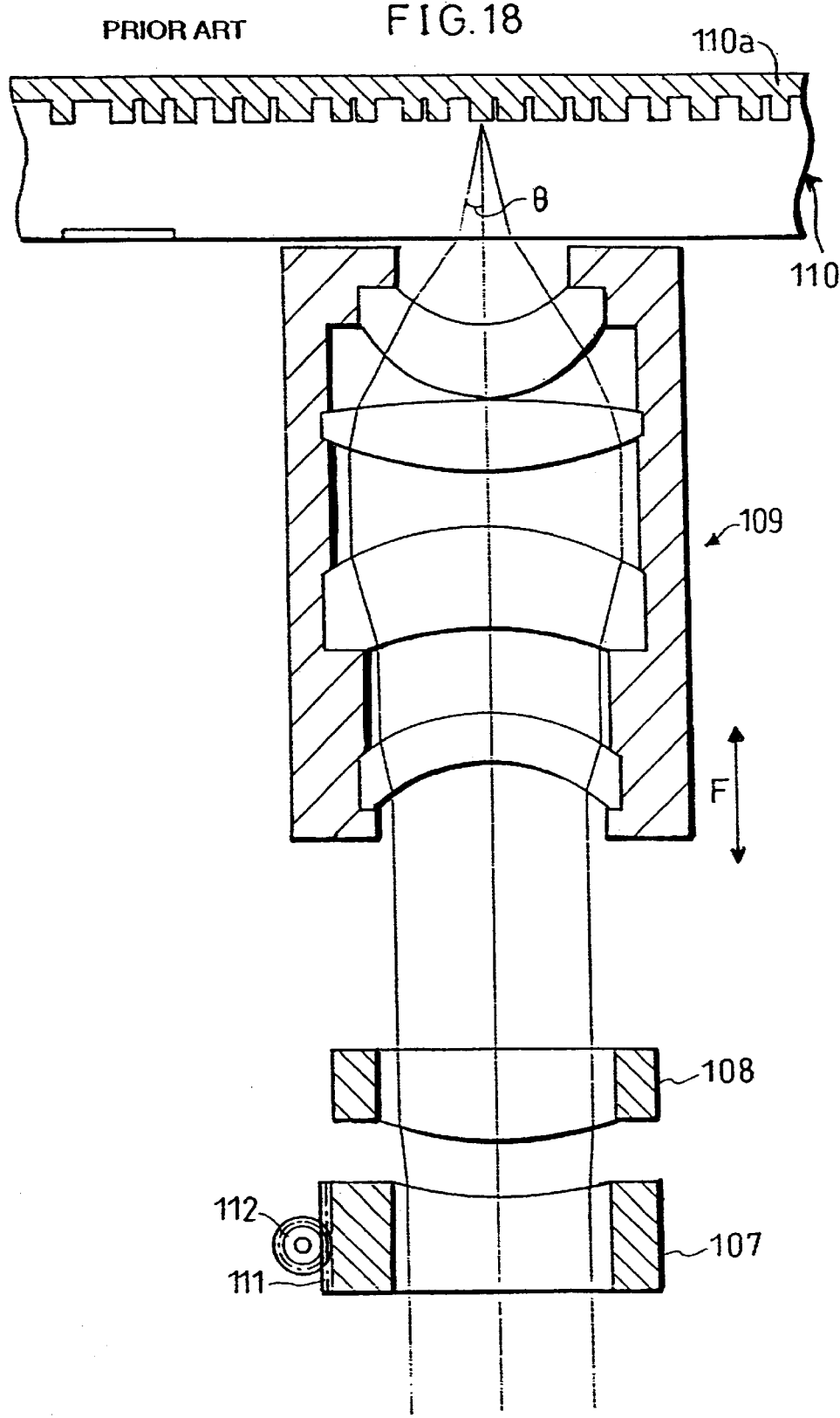

APPARATUS AND METHOD FOR OPTICAL RECORDING/REPRODUCING INFORMATION INCLUDING ELECTRICAL SPHERICAL-ABERRATION CORRECTION MECHANISM HAVING LOW POWER CONSUMPTION

FIELD OF THE INVENTION

The present invention relates to an optical recording/reproducing apparatus which is provided with a mechanism for correcting spherical aberration of a light spot formed by converging light on a data layer of a recording medium by changing a distance between groups of lenses.

BACKGROUND OF THE INVENTION

With respect to the prior art, an explanation will be given of a device disclosed in Japanese Laid-Open Patent Application No. 188301/1998 (Tokukaihei 10-188301, published on Jul. 21, 1998).

FIG. 17 is an explanatory drawing that shows a combination lens in accordance with the conventional technique.

This application discloses a combination lens barrel which changes the combination of lenses and the gap between the combined lenses so that the spherical aberration of a converged light spot on a recording medium is altered.

As illustrated in FIG. 17, upon converging light on a recording medium 104 through a combination lens 106, a first lens 100 is placed on the side of a light source, not shown, and a second lens 101 is placed on the side closer to the recording medium 104 with respect to the first lens 100. A focus radial actuator (FR actuator) 102 allows the first lens 100 and the second lens 101 to shift in focusing and radial directions. A spherical-aberration correcting actuator 103 drives the second lens 101 to shift in the focusing direction so as to change the gap between the first lens 100 and the second lens 101, thereby making it possible to correct the spherical aberration of a converged light spot formed on a recording layer 105 of a recording medium 104.

Light rays, emitted from a light source (not shown), are directed to a combination lens 106 by an optical part (not shown), and converged onto the recording layer 105 of the recording medium 104.

The reason that the combination lens 106 consisting of a plurality of lenses (first lens 100, second lens 101) is provided is because the numerical aperture of the lens is increased, with the result that the use of only one lens makes it difficult to design and manufacture a light-converging system that can converge light efficiently.

When there is an error in the optical thickness from the surface of the recording medium 104 on the combination lens side to the recording layer 105, a spherical aberration is generated on a light spot converged on the recording layer 105. Here, since the numerical aperture of the lens is great, the amount of generation of the spherical aberration with respect to the error in the optical thickness from the surface on the combination lens side to the recording layer 105 becomes greater as compared with a lens having a low numerical aperture. For this reason, the gap between lenses is changed so as to reduce the generation of spherical aberration and also to provide an arrangement that is suitable for a recording medium having two or more recording layers.

In this case, the optical thickness refers to a thickness determined by a thickness of a light-transmitting body (or a light-transmitting layer) that transmits light and its refractive index; and even in the case when thicknesses (mechanical thicknesses) are different, if the sizes of spherical aberrations of light spots converged through the respective light-transmitting bodies are coincident, the optical thicknesses of them are assumed to be the same.

Moreover, the error in the optical thickness from the surface of the recording medium on the lens side to the recording layer refers to a difference between an optical thickness of a light-transmitting body (or a light-transmitting layer) that has been assumed at the time of the lens designing and an actual optical thickness from the surface of the recording medium on the combination lens side to each recording layer that is obtained at the time of actually recording/reproducing information on/from the recording medium.

With respect to a driving system for changing the gap between lenses, a system referred to as "voice coil motor" has been proposed, in which: an electromagnetic force is generated by allowing a positive or negative current to flow through a coil so as to generate an electromagnetic force, thereby making the second lens 101 to shift in focussing up and down directions by utilizing a thrust generated between magnets and coils (for example, Japanese Laid-Open Patent Application No. 255290/1998 (Tokukaihei 10-255290, published on Sep. 25, 1998).

Such a spherical-aberration correcting mechanism, which changes the gap between lenses, makes it possible to properly adjust the amount of shift of the second lens 101, that is, the gap between the first lens 100 and the second lens 101, so that it becomes possible to correct the spherical aberration generated due to an error in the optical thickness from the recording medium on the combination lens side to the recording layer.

Next, an explanation will be given by exemplifying an invention disclosed in Japanese Laid-Open Patent Application No. 266511/1993 (Tokukaihei 5-266511, published on Oct. 15, 1993).

In FIG. 18, a plano-concave lens 107 and a plane-convex lens 108 are placed between an objective lens 109 and a light source (not shown), and the plano-concave lens 107 is shifted in the light axis direction in accordance with the optical thickness of the optical recording medium (corresponding to "the thickness of the protective layer" in Japanese Laid-Open Patent Application No. 266511/1993 (Tokukaihei 5-266511)) so as to correct spherical aberration.

The light, transmitted through the plane-convex lens 108, is converged on a recording layer 110a of an optical recording medium 110 by an objective lens 109 constituted by a plurality of lenses.

In this case, different from the aforementioned example, the spherical aberration is corrected not by the objective lens 109 constituted by a plurality of lenses, but by changing the lens gap of the lenses (plano-concave lens 107 and plane-convex lens 108) that are placed between the objective lens 109 and the light source.

Moreover, with respect to such a lens driving system, those driven by gears have been disclosed. In other words, a mesh section 111 having a concavo-convex shape formed on the peripheral face of the plano-concave lens 107 and a gear 112 rotatably secured to a shaft are engaged with each other, and the plano-concave lens 107 is driven in the light axis direction by rotating the gear 112.

Such spherical-aberration correcting mechanisms usually have a system driven electrically; and as compared with the use of a lens having a low numerical aperture, the use of a lens having a high numerical aperture needs high power consumption so as to drive the spherical-aberration correcting mechanism, with the result that a problem of wasteful power consumption arises. Moreover, in the case of the arrangement having a spherical-aberration correcting actuator built in a combination lens barrel, as in the case of the voice coil motor disclosed in Japanese Laid-Open Patent Application No. 255290/1998 (Tokukaihei 10-255290), upon application of a current to a coil, the coil is heated, with the result that parts in the lens barrel are subjected to thermal expansion; this causes variations in the gap, tilt and di-center between the first and second lenses, resulting in a failure in providing an appropriate converged light spot.

SUMMARY OF THE INVENTION

The present invention has been devised to solve the above-mentioned problems, and its objective is to reduce power consumption in a spherical-aberration correcting mechanism for correcting a spherical aberration generated by an error in the optical thickness of a recording medium, and consequently to improve the reliability of the mechanism at the time of recording or reproducing. Moreover, in the case of an optical recording and reproducing apparatus which records and reproduces information on and from a recording medium with a plurality of recording layers as well as a recording medium with only a single recording layer, it becomes possible to reduce the power consumption and also to improve the recording density of the recording medium.

An optical recording/reproducing apparatus in accordance with the present invention, which records/reproduces information on/from a recording medium having recording layers the number of which is represented by N ($N \geq 2$) by converging light rays from a light source thereon, is provided with: two lens groups, each including at least one lens, placed in a light path from the light source to the recording medium; and a spherical-aberration correcting mechanism which changes a lens group gap between the two groups by means of electrical driving so as to correct spherical aberration of a converged light spot formed on each of the recording layers, wherein, supposing that the N number of recording layers are a first recording layer, . . . , an N-th recording layer in succession from the lens group side, at the time of correcting the spherical aberration of the converged light spot formed on the first recording layer, the lens group gap is represented by DIS(1) and the intensity of an applied current to the spherical-aberration correcting mechanism is ec1, and at the time of correcting the spherical aberration of the converted light spot formed on the N-th recording layer, the lens group gap is represented by DIS(N) and the intensity of an applied current to the spherical-aberration correcting mechanism is represented by ecN, said spherical-aberration correcting mechanism is operated so as to satisfy a relationship:

$$|ec1|=|ecN|,$$

and when the applied current to the spherical-aberration correcting mechanism is zero, a lens group gap dst(3) satisfies the following relationship:

$$dst(3)=[DIS(1)+DIS(N)]/2.$$

With the above-mentioned relationship, it is possible to reduce the power consumption for correcting the spherical aberration at the converged light spot.

Moreover, another optical recording/reproducing apparatus in accordance with the present invention, which records/reproduces information on/from a recording medium having at least one recording layer, is provided with: a light source; two lens groups, each including at least one lens, placed in a light path from the light source to the recording medium; and a spherical-aberration correcting mechanism which changes a lens group gap between the two groups by means of electrical driving so as to correct spherical aberration of a converged light spot formed on the recording layers, wherein, in the case when the recording medium has layers the number of which is represented by N ($N \geq 2$), supposing that the N number of recording layers are a first recording layer, . . . , an N-th recording layer in succession from the lens group side, at the time of correcting the spherical aberration of the converged light spot formed on the first recording layer, the lens group gap is represented by DIS(1) and the intensity of an applied current to the spherical-aberration correcting mechanism is ec1, and at the time of correcting the spherical aberration of the converted light spot formed on the N-th recording layer, the lens group gap is represented by DIS(N) and the intensity of an applied current to the spherical-aberration correcting mechanism is represented by ecN, said spherical-aberration correcting mechanism is operated so as to satisfy a relationship:

$$|ec1|=|ecN|,$$

and when the applied current to the spherical-aberration correcting mechanism is zero, a lens group gap dst(3) satisfies the following relationship:

$$dst(3)=[DIS(1)+DIS(N)]/2,$$

in the case when the recording medium has only a single layer, an optical thickness from the surface of the recording layer on the lens group side to the recording layer of the recording medium and an optical thickness that is allowed to correct the spherical aberration when the lens group gap is set to said dst(3) are made virtually coincident with each other.

With the above-mentioned arrangement, in the case when information is recorded or reproduced on or from a recording medium having a plurality of recording layers or a recording medium having only a single recording layer, it is possible to reduce the power consumption in the spherical-aberration correcting mechanism and also to improve the recording density.

For a fuller understanding of the nature and advantages of the invention, reference should be made to the ensuing detailed description taken in conjunction with the accompanying drawings.

BRIEF DESCRIPTION OF THE DRAWINGS

FIG. 18 is an explanatory drawing that shows another example of a combination lens in a conventional technique.

DESCRIPTION OF THE EMBODIMENTS

Referring to Figures, the following description will discuss embodiments of the present invention. However, the present invention is not intended to be limited thereby.

Figure 1:
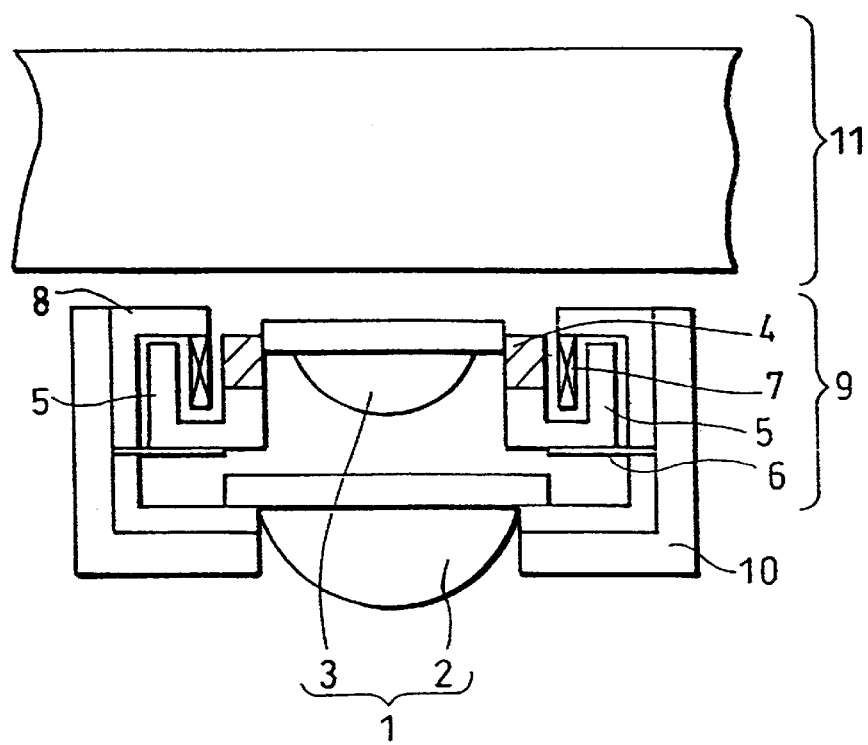
FIG. 1 is an explanatory drawing that shows a spherical-aberration correcting mechanism in accordance with the present invention.

FIG. 1 shows an essential portion of an optical head in an optical recording/reproducing apparatus in accordance with the present invention.

Here, a first lens 2 may constitute a first group of lenses, and a second lens 3 may constitute a second group of lenses. In this case, each group of lenses only include one lens; however, this may include a plurality of lenses.

Referring to FIG. 1, an explanation will be given of a combination lens and a spherical-aberration correcting mechanism formed by a voice coil motor.

The combination lens 1 is constituted by two lenses, that is, the first lens 2 on the light source side and the second lens 3 on the side opposite to the light source with the second lens 2 located in between. Here, upon carrying out recording or reproducing on or from the recording medium 11, the second lens 3 is located on the recording medium 11 side. The second lens 3 is secured to a magnet 4, and the magnet 4 is supported by a plate spring 6 through a magnet support member 5. Moreover, a coil 7 is supported by a coil support member 8. A voice coil motor 9, constituted by the magnet 4, the magnet support member 5, the plate spring 6 and the coil 7, allows the second lens 3 to shift in the focusing direction (in a direction parallel to the normal to the recording medium 11) by applying a positive or negative current to the coil 7. In other words, this makes it possible to change the gap between the first lens 2 and the second lens 3.

The combination lens 1, the voice coil motor 9 and other supporting members, etc. are housed inside a lens barrel 10 of the combination lens. The combination lens barrel 10 is driven in focusing and radial directions of a recording medium 11 by an FR actuator (not shown).

Figure 2:
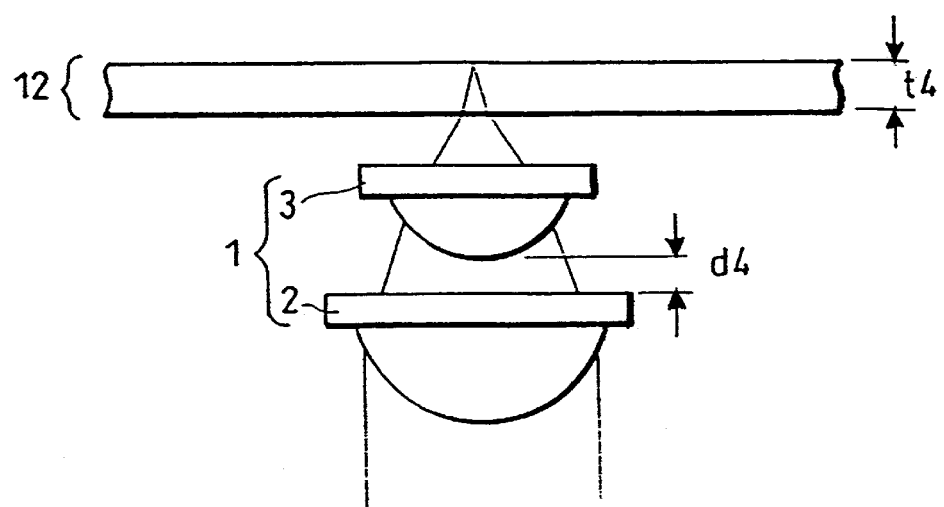
FIG. 2 is an explanatory drawing that shows a combination lens in accordance with the present invention.

As illustrated in FIG. 2, the combination lens 1 has a lens gap d4, and is designed so as to minimize the spherical aberration of a light spot formed by converging light transmitted through a light-transmitting body 12 having an optical thickness of t4.

The light-transmitting body 12 is made of a transparent material that transmits light, and corresponds to a light-transmitting layer of a recording medium, on which assumption is made at the time of designing lenses. Here, this light-transmitting body or light-transmitting layer is referred to as a cover glass layer or a protective layer, and made of various kinds of materials, such as polycarbonate (PC), glass or UV cure resins.

The size of the spherical aberration of a light spot formed by converging light by the combination lens 1 changes depending on the thickness and refractive index of the light-transmitting body (or the light-transmitting layer), the refractive index, and the gap between lenses in the combination lens. Therefore, the gap of the lenses of the combination lens is fixed, and when the sizes of the spherical aberrations of light spots formed by converged light rays that have passed through different light-transmitting bodies are the same, it is assumed that the optical thicknesses of these light-transmitting bodies are the same.

Moreover, the present recording medium is provided with a light-transmitting layer, a recording layer and, if there are a plurality of recording layers, a light-transmitting layer between the recording layers; and in the following description, in some cases, the light-transmitting layer, the recording layer and the light-transmitting layer between the recording layers, which are located from the surface of the recording medium on the combination lens side up to the position in the recording medium on which light spot is formed may be referred to collectively as a light-transmitting layer.

The following description will discuss a recording medium having two recording layers.

Figure 3:
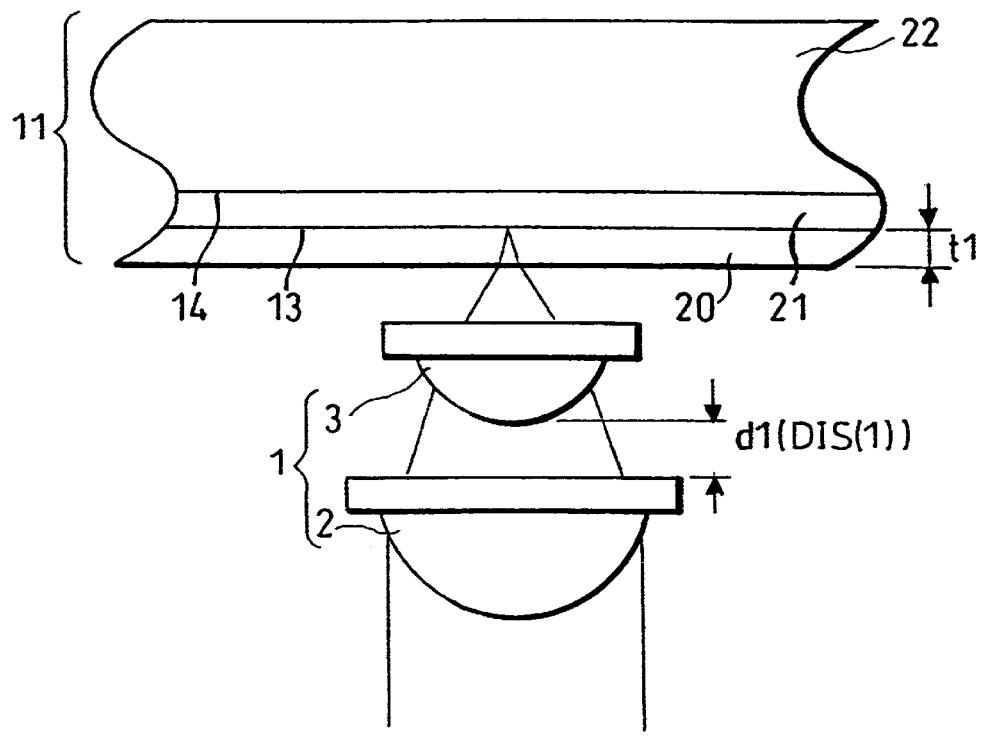
FIG. 3 is an explanatory drawing that shows the combination lens of the present invention, as well as a case in which recording or reproducing is carried out on a plurality of recording layers by using the combination lens.

FIG. 3 shows a case in which, of the two recording layers, a converged light spot is formed on the first layer 13 closer to the combination lens 1 side of the recording medium 11.

Here, the recording medium 11 has a laminated construction that is constituted by a light-transmitting layer 20, a first recording layer 13, a light-transmitting layer 21 placed between recording layers, a second recording layer 14 and a substrate layer 22, which are formed in succession in this order from the combination lens side of the recording medium 11.

In this case, the lens gap of the combination lens 1 as explained in FIG. 2 is changed to d1 (corresponding DIS(1) in claims), with the result that light from a light source, not shown, is allowed to pass through the optical thickness t1 from the surface of the recording medium 11 on the combination lens side up to the first recording layer 13 to be converged so that the spherical aberration occurring on the converged light spot is corrected. Here, the FR actuator carries out the positioning operation of the converged light spot onto the recording layer, and the spherical-aberration correcting mechanism carries out the correction of spherical aberration of the converged light spot.

Here, in order to change the lens gap, a current is applied to the voice coil motor 9 (see FIG. 1), and the applied current is represented by +i1 (or −i1). In this case, the applied current +i1 or −i1 corresponds to ec1 in claims.

Figure 4:
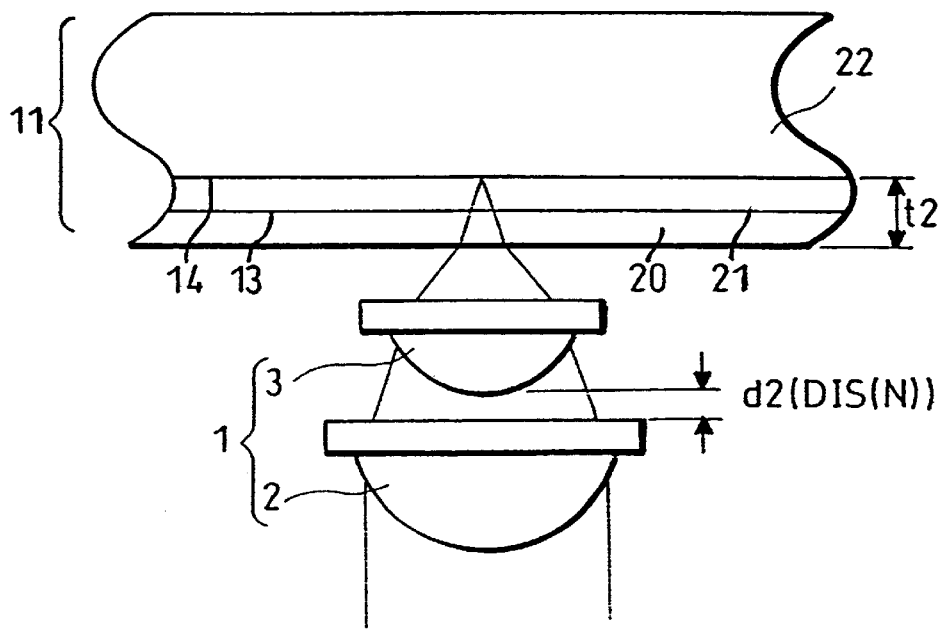
FIG. 4 is an explanatory drawing that shows the combination lens of the present invention, as well as a case in which recording or reproducing is carried out on a plurality of recording layers by using the combination lens.

FIG. 4 shows a case in which, of the two recording layers, a converged light spot is formed on the second recording layer 14 farther from the combination lens side of the recording medium 11.

In this case, the lens gap of the combination lens 1 as explained in FIG. 2 is changed to d2 (corresponding to DIS(N) in claims), with the result that light is allowed to pass through the optical thickness t2 from the surface of the recording medium 11 on the combination lens side up to the second recording layer 14 to be converged so that the spherical aberration occurring on the converged light spot is corrected.

Here, in order to change the lens gap, a current is applied to the voice coil motor 9, and the applied current is represented by −i2 (or +i2). In this case, the applied current +i2 or −i2 corresponds to ecN in claims.

Figure 5:
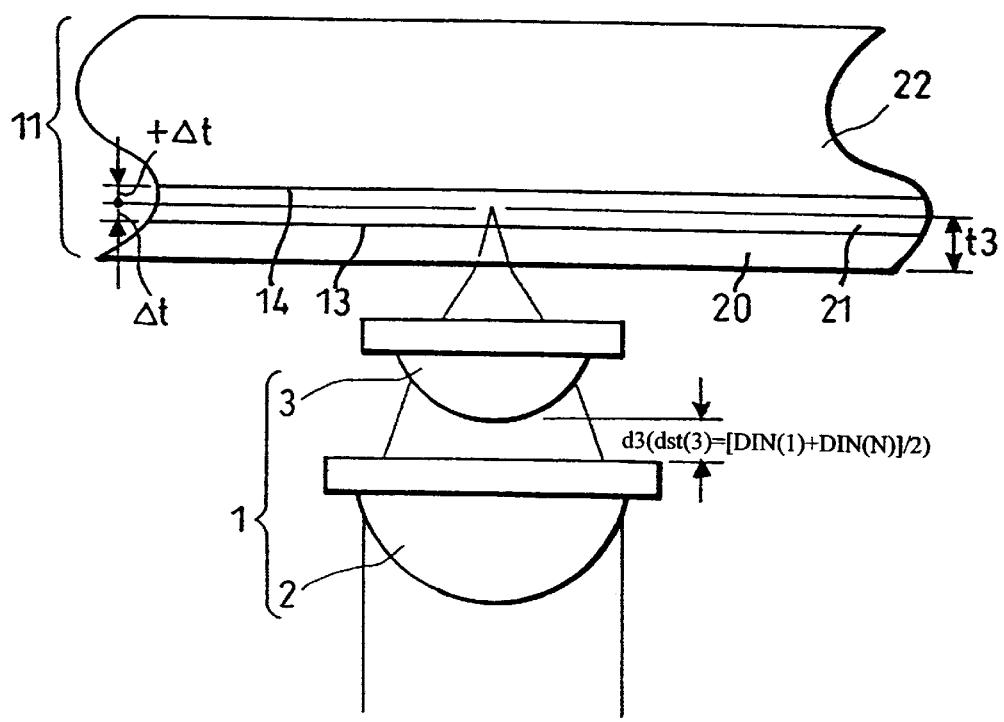
FIG. 5 is an explanatory drawing that shows the combination lens of the present invention, as well as a case in which recording or reproducing is carried out on a plurality of recording layers by using the combination lens.

FIG. 5 shows a case in which the lens gap of the combination lens 1 as explained in FIG. 2 is set to d3 (corresponding to dst(3) in claims).

Here, the following relational expression is given:

$$d3=(d1+d2)/2 \quad (1)$$

Moreover, the spherical-aberration correcting mechanism is arranged so that, at this time, the current to be applied to the voice coil motor 9 becomes virtually zero.

Here, the optical thickness of the light-transmitting body (or the light-transmitting layer), which can be corrected at the time of the lens gap d3, is t3; therefore, FIG. 5 shows a state in which a converged light spot is formed at a position which allows the optical thickness from the surface of the recording medium 11 on the combination lens side to be set at t3.

In the voice coil motor 9, it is possible to provide a virtually linear relationship with respect to the relationship between the applied current and the amount of shift of the body to be driven (in this case, the second lens 3), and in this case also, the voice coil motor 9 is designed in such a manner.

Here, the relationship between the optical thickness of the light-transmitting layer (in this case, the optical thickness from the surface of the recording medium on the combination lens side up to the position at which a converged light spot is formed) and the spherical aberration and the relationship between the amount of correction of the spherical aberration and the lens gap of the combination lens 1 are virtually a linear relationship; therefore, the spherical-aberration correcting mechanism is designed so that the applied current becomes zero at a neutral point (where the lens gap is d3) of the spherical-aberration correcting mechanism. Thus, the relationship between applied currents to the voice coil motor 9 in the states as shown in FIGS. 3 and 4 is represented as follows:

$$|i1|=|i2| \quad (2)$$

Here, it is desirably determined whether the applied current is set to negative or positive.

This arrangement achieves the following effects:

For example, in the case when the spherical-aberration correcting mechanism is designed so that the applied current becomes virtually zero in the state of FIG. 3, the applied current i in the state of FIG. 4 is represented as follows:

$$|i|=2\times|i1|=2\times|i2| \quad (3)$$

Therefore, in the manner as described in the present invention, when the spherical-aberration correcting mechanism is designed so that the applied current becomes virtually zero in the state of FIG. 5, it becomes possible to reduce the maximum applied current ($|i1|=|i2|$) to be supplied to the spherical-aberration correcting mechanism.

Moreover, in the case when information recording or reproducing is carried out on the first recording layer 13 and the second recording layer 14 at the same ratio, rather than arranging the spherical-aberration correcting mechanism so that the applied current becomes virtually zero in the state of FIG. 3, the spherical-aberration correcting mechanism is arranged so that the applied current becomes virtually zero in the state of FIG. 5; thus, the power consumption is reduced to ½, thereby making it possible to cut the power consumption.

Moreover, in the case of the spherical-aberration correcting mechanism constituted by the voice coil motor 9 and the combination lens 1, since the voice coil motor 9 is housed inside the combination lens barrel 10, the coil 7 tends to be heated (or generated heat resides without being released) upon application of a current to the coil 7. Therefore, it is more preferable to achieve low power consumption and minimized maximum applied current, and these effects can be obtained by arranging the spherical-aberration correcting mechanism so that the applied current becomes virtually zero in the state of FIG. 5. The reason for this is explained as follows:

When the coil 7 is heated, the coil support member 8 and other parts are subjected to thermal expansion, with the result that the lens gap is altered. In the case when the applied current having a predetermined size is applied to the voice coil motor 7 so as to correct the spherical aberration of the light spot converged on each of the recording layers of the recording medium 11, since the initial value of the lens gap is offset from the designed value due to the thermal expansion, the spherical aberration of the converged light spot becomes greater, giving adverse effects on information recording and reproducing processes. In particular, in the case of a combination lens having a high numerical aperture, the adverse effects become greater. Moreover, when the effects of thermal expansion are irregularly exerted on the combination lens barrel 10, a tilt and di-center occur between combined lenses, causing coma-aberration and resulting in adverse effects on information recording and reproducing processes in the same manner as spherical aberration.

More preferably, the optical thickness t3 of FIG. 5 and the optical thickness t4 of the light-transmitting body of FIG. 2 are made virtually coincident with each other. In other words, the lens gap d3 and the lens gap d4 are also made virtually coincident with each other, and the recording densities of the recording layer at two positions of the optical thicknesses of t3+Δt and t3−Δt (that is, a position at which the optical thicknesses are the same with t3 located in between) are made equal to each other. Here, Δt is not equal to zero.

Figure 6A:
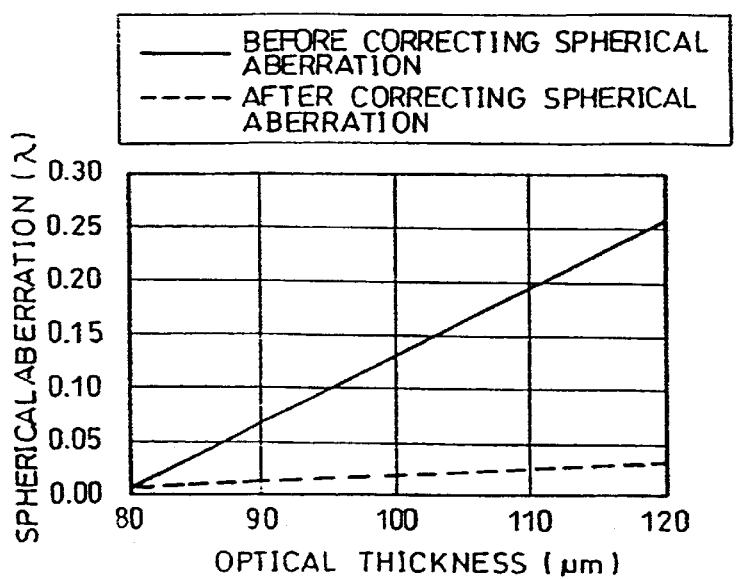
FIGS. 6(a), 6(b) and 6(c) are explanatory drawings that show a case in which the thickness of a light-transmitting layer at the time of designing the combination lens of the present invention is defined as a first layer.
Figure 6B:
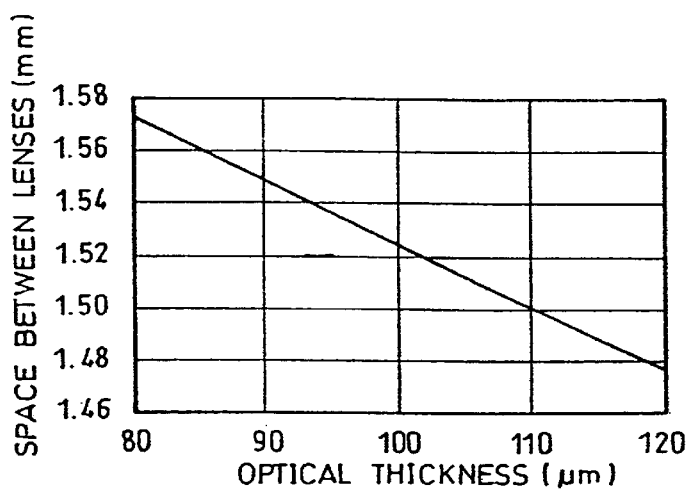
Figure 6C:
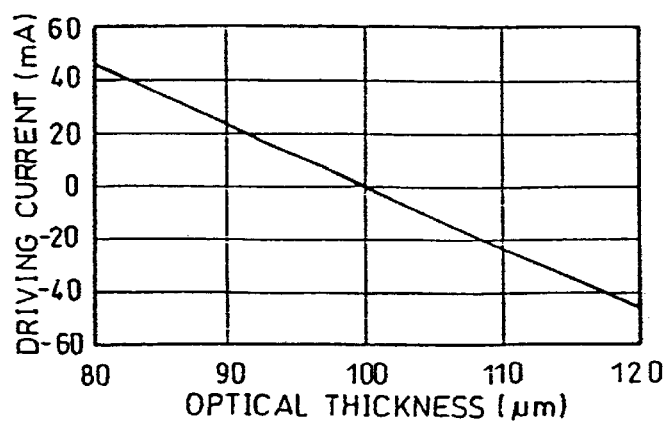

Referring to FIGS. 6(a), 6(b) and 6(c) as well as FIGS. 7(a), 7(b) and 7(c), an explanation will be given of the effects of this arrangement.

Figure 7A:
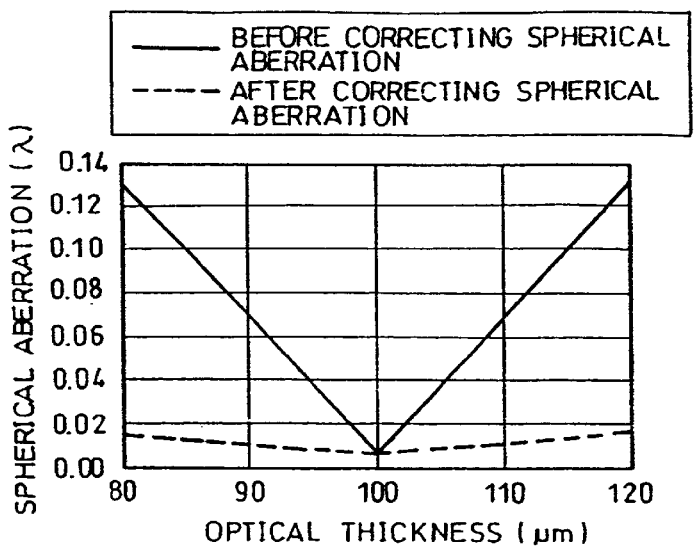
FIGS. 7(a), 7(b) and 7(c) are explanatory drawings that show a case in which the thickness of a light-transmitting layer at the time of designing the combination lens of the present invention is defined as a thickness between the first and second layers.

FIG. 6(a) and FIG. 7(a) show the relationship (before the spherical aberration correction and after the correction) between the optical thickness (corresponding to the optical thickness from the surface of the recording medium on the combination lens side) and the spherical aberration. FIG. 6(b) and FIG. 7(b) show the relationship between the optical thickness (corresponding to the optical thickness from the surface of the recording medium on the combination lens side) and the gap between the first lens and the second lens at the time of correcting the spherical aberration. FIG. 6(c) and FIG. 7(c) show the relationship between the optical thickness (corresponding to the optical thickness from the surface of the recording medium on the combination lens side) and the applied current that is supplied to the voice coil motor at the time of correcting the spherical aberration.

FIGS. 6(a) through 6(c) show characteristics of a combination lens and explains the case in which, with respect to light rays that have passed through a light-transmitting body having an optical thickness of 80 μm and a refractive index of 1.53, and have been converged, the combination lens is designed so as to minimize the spherical aberration of the converged light spot; and in this case, the lens gap is set to 1.572 mm and the numerical aperture is set to 0.85.

FIGS. 6(a) through 6(c) show the case in which the first layer is located at a position 80 μm apart from the surface of the recording medium on the combination lens side and the second layer is located at a position 120 μm apart therefrom; and the refractive index between them is set to a constant value of 1.53.

As shown in FIG. 6(a), the spherical aberration remaining after the spherical aberration correction is a minimum at the position of 80 μm, and becomes a maximum at the position of 120 μm. Moreover, as illustrated in FIG. 6(b), the lens gap is 1.477 mm when an attempt is made to correct the spherical aberration in the case of the thickness of the recording medium of 120 μm.

Therefore, the spherical-aberration correcting mechanism is designed so that in the case when the applied current to the voice coil motor is zero, the lens gap is set to:

1.523 mm=(1.572 mm+1.477 mm)/2.

As shown in FIG. 6(c), the values of applied currents to the voice coil motor, used for respectively correcting the spherical aberrations of light spots converged on the first recording layer and the second recording layer, are made virtually coincident with each other.

Figure 7B:
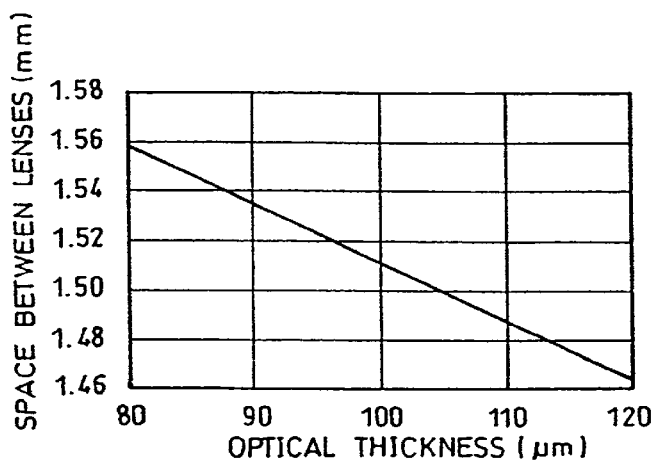
Figure 7C:
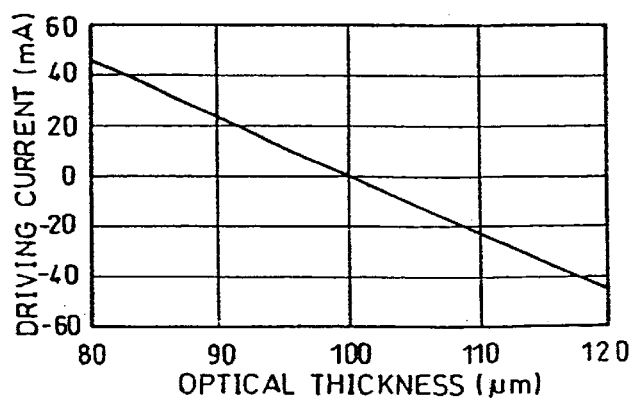

FIGS. 7(a) through 7(c) show characteristics of a combination lens and explains the case in which, with respect to light rays that have passed through a light-transmitting body having an optical thickness of 100 μm and a refractive index of 1.53, and have been converged, the combination lens is designed so as to minimize the spherical aberration of the converged light spot; and in this case, the lens gap is set to 1.512 mm and the numerical aperture is set to 0.85.

FIGS. 7(a) through 7(c) show the case in which the first recording layer is located at a position 80 μm apart from the surface of the recording medium on the combination lens side and the second recording layer is located at a position 120 μm apart therefrom; and the refractive index between them is set to a constant value of 1.53.

As illustrated in FIG. 7(a), the recording medium thickness t3, which can be corrected by using the lens gap d3 in FIG. 5, and the optical thickness t4 (100 μm in this case) of the light-transmitting body determined at the time of lens designing shown in FIG. 2 are allowed to virtually coincide with each other (that is, d3 and d4 are also made virtually coincident with each other). Therefore, the value of the spherical aberration remaining after the spherical aberration correction is a minimum at the position of 100 μm, and the sizes of the spherical aberrations exerted at the positions of 80 μm and 120 μm are also made virtually coincident with each other.

As compared with the case of FIGS. 6(a) through 6(c), the above-mentioned arrangement is characterized in that: the optical thickness t3 of FIG. 5 and the optical thickness t4 of the light-transmitting body of FIG. 2 are made virtually coincident with each other; the recording layers are located at positions of the optical thicknesses of t3+Δt and t3−Δt (in this case, Δt is 20 μm); and the relationship between the optical thickness of the light-transmitting layer (in this case, the optical thickness from the surface of the recording medium on the combination lens side to the position at which a converged light spot is formed) and the spherical aberration has a linear relationship; therefore, the spherical aberrations (after correction) exerted on light spots converged on the respective recording layers are allowed to have smaller maximum values, and also made virtually equal to each other. In other words, the sizes of the converged light spots on the two recording layers can also be made virtually coincident with each other. Consequently, it becomes possible to make the recording densities of the respective recording layers coincident with each other; thus, upon carrying out information recording or reproducing on or from the two recording layers, even when switching is made between the recording layers to be reproduced or recorded, it is not necessary to change the number of rotations at which the recording medium is rotated. In other words, it is not necessary to provide dead time for waiting for the spindle servo to stand still. In other words, it is possible to reduce power consumption at the time of correcting spherical aberration, and consequently to reduce loads imposed on systems such as a rotation controlling system for the recording medium.

Next, an explanation will be given of a recording medium preferably used for the optical recording/reproducing apparatus of the present invention.

Figure 8:
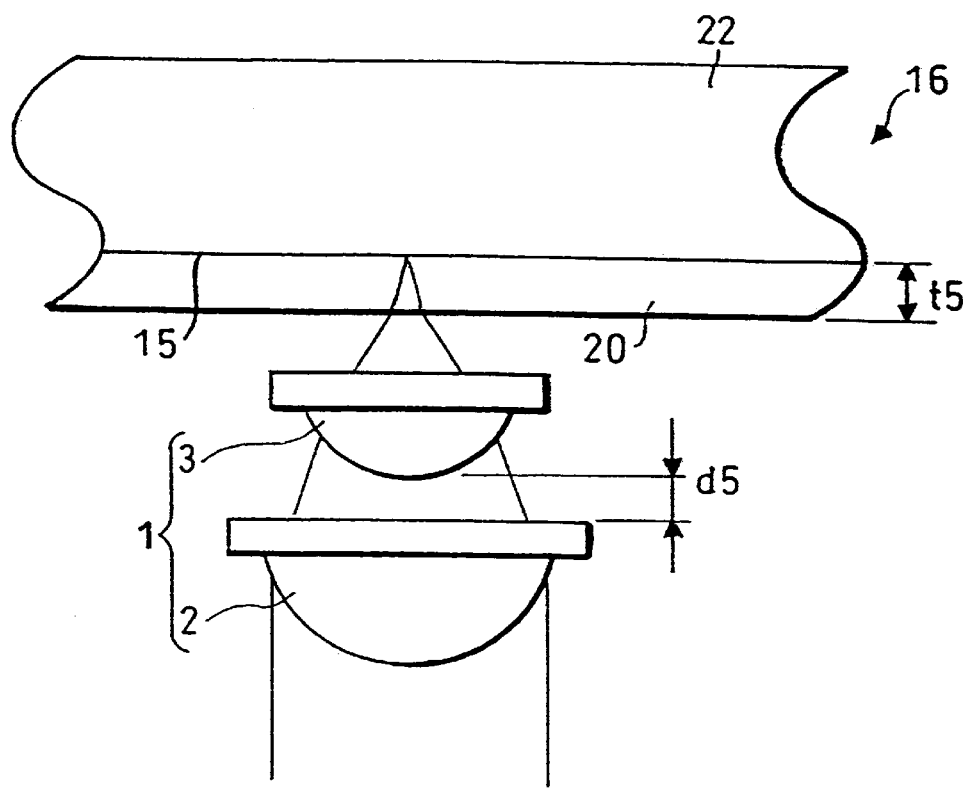
FIG. 8 is an explanatory drawing that shows a state in which recording or reproducing is carried out on a recording medium having a recording layer of a single layer by using an optical recording/reproducing apparatus in accordance with the present invention.

As illustrated in FIG. 8, a recording medium 16 has a single recording layer 15, and its optical thickness from the surface of the recording medium 16 on the combination lens side to the recording layer 15 is set to t5. Here, this is designed to be virtually coincident with the optical thickness t3 shown in FIG. 5. In other words, the lens gap d5, set so as to correct the spherical aberration of a light spot converged on the recording layer 15, is also allowed to virtually coincide with the lens gap d3 shown in FIG. 5.

In this arrangement, upon recording or reproducing information on or from the recording medium 16 having a single recording layer 15, the applied current to be supplied to the spherical-aberration correcting mechanism (spherical-aberration compensating mechanism), that is, a voice coil motor 9 (see FIG. 1), can be made virtually zero, thereby making it possible to reduce the power consumption. Moreover, it is possible to reduce adverse effects on the optical characteristics due to generation of heat in the coil.

More preferably, in addition to the above-mentioned arrangement, an arrangement is made so that the optical thickness t4 of the light-transmitting body shown in FIG. 2 and the optical thickness t5 shown in FIG. 8 (the optical thickness from the surface of the recording medium 16 on the combination lens side to the recording layer 15) are made virtually coincident with each other. In the case when the recording medium 16 having a single recording layer (shown in FIG. 8) is used so as to record or reproduce information thereon or therefrom in an optical recording/reproducing apparatus for recording/reproducing information on/from the recording medium 11 having two recording layers (shown in FIG. 3), this arrangement makes it possible to minimize the spherical aberration of the light spot converged on the recording layer 15 of the recording medium 16 having a single recording layer, and also to make the size of the converged light spot smaller. Therefore, it is possible to increase the recording density of the recording medium 16 having a single recording layer 15, and the recording medium having such as arrangement provides a recording medium suitable for the optical recording/reproducing apparatus of the present invention.

As described above, an explanation has been given of a case in which, with respect to the spherical-aberration correcting mechanism consisting of two lens groups, each constituted by at least one lens, a combination lens for converging light rays from the light source on the optical recording medium is used; however, the spherical-aberration correcting mechanism may be installed in a separated manner from the combination lens (objective lens) for converging light rays from the light source onto the recording medium. For example, the spherical-aberration may be corrected by a plurality of lenses placed between the light source and the objective lens.

Next, referring to FIGS. 9 through 16, an explanation will be given of an example in which spherical-aberration is corrected by a plurality of lenses placed between the light source and the objective lens. In this case, various types of objective lens may be used, and in FIGS. 9 through 11, an explanation will be given of an objective lens 27 which is designed so that, when light rays having no spherical aberration are made incident thereon, the spherical aberration of a light spot which is formed by the light rays transmitted through a light-transmitting body having an optical thickness that is optically equivalent to an optical thickness P3−ΔP (ΔP≠0), that is, the spherical aberration of the converged light spot on the first recording layer 13 is minimized. Here, the optical thickness at the mid-point between the first recording layer 13 and the second recording layer 14 is defined as p3, and the optical thickness of the second recording layer 14 is defined as p3+Δp.

Figure 9:
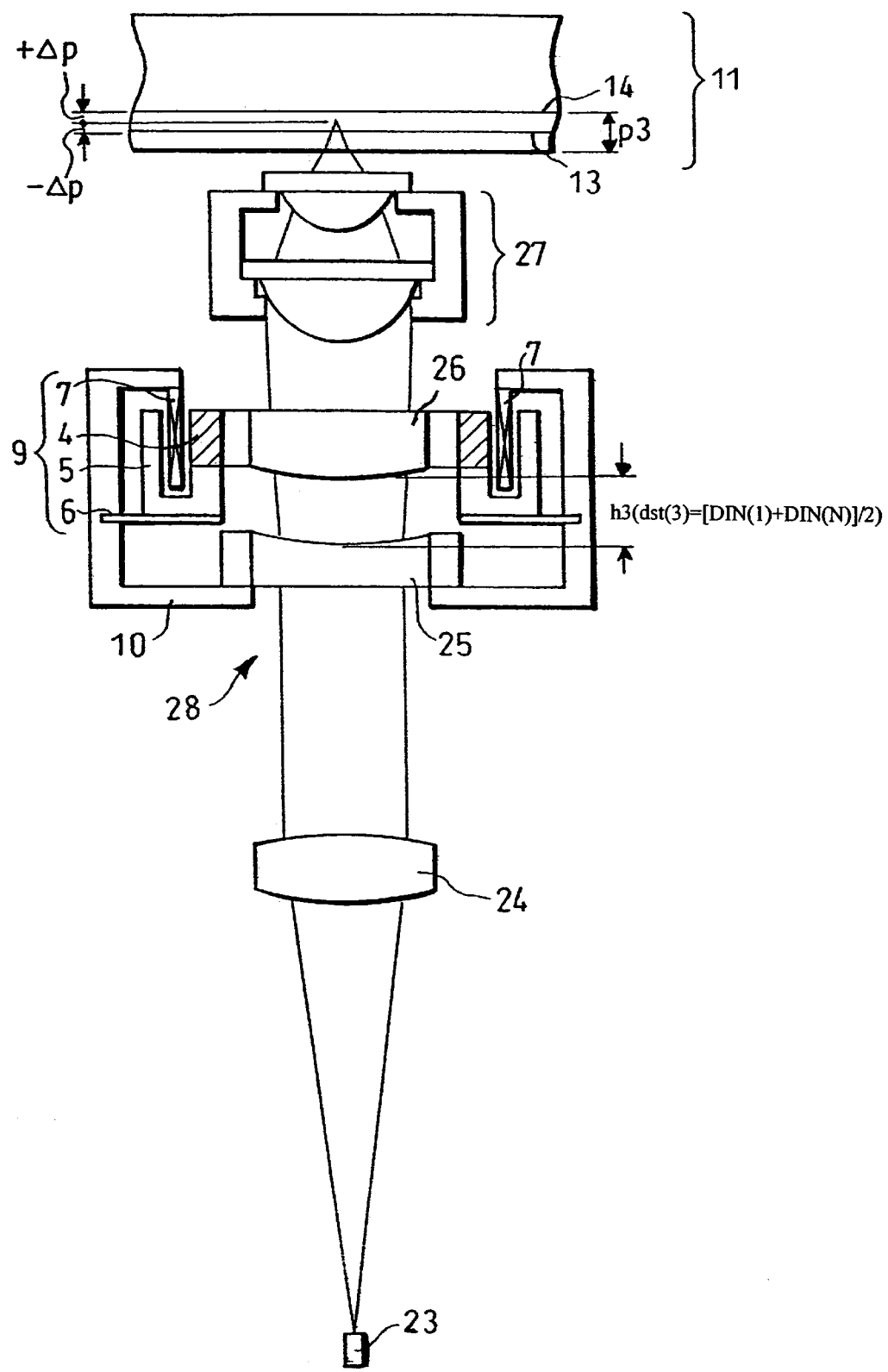
FIG. 9 is an explanatory drawing that shows an arrangement in which spherical aberration is corrected by using a plurality of lenses placed between a light source and an objective lens, in the optical recording/reproducing apparatus of the present invention.
Figure 10:
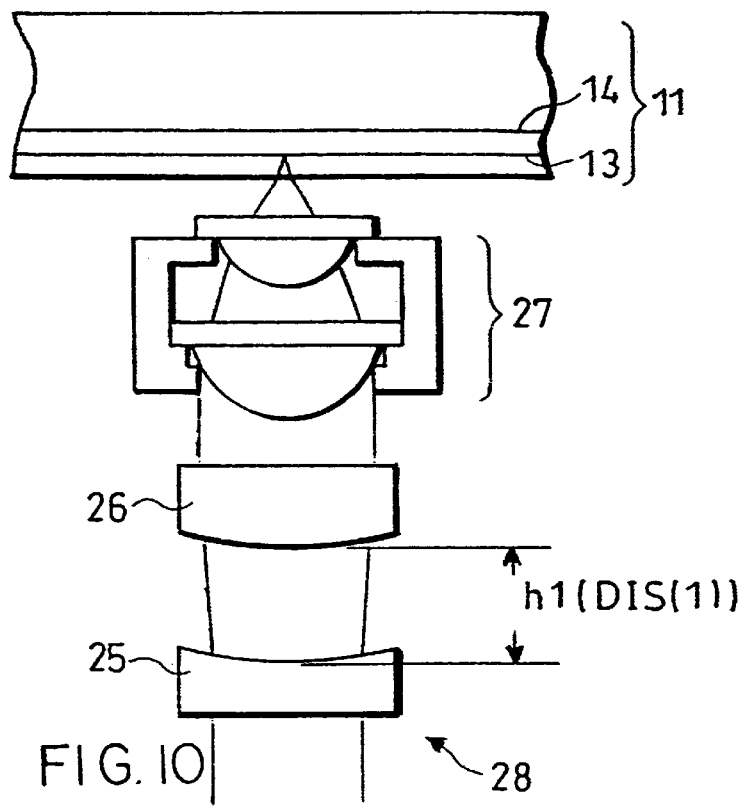
FIG. 10 is an explanatory drawing that shows an operation for correcting spherical aberration in the optical recording/reproducing apparatus shown in FIG. 9.
Figure 11:
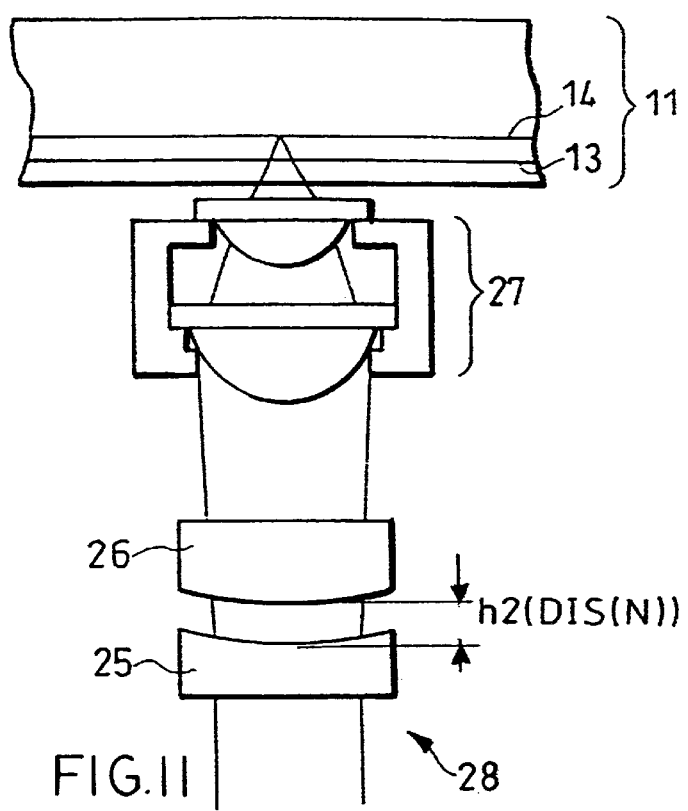
FIG. 11 is an explanatory drawing that shows another operation for correcting spherical aberration in the optical recording/reproducing apparatus shown in FIG. 9.
Figure 12:
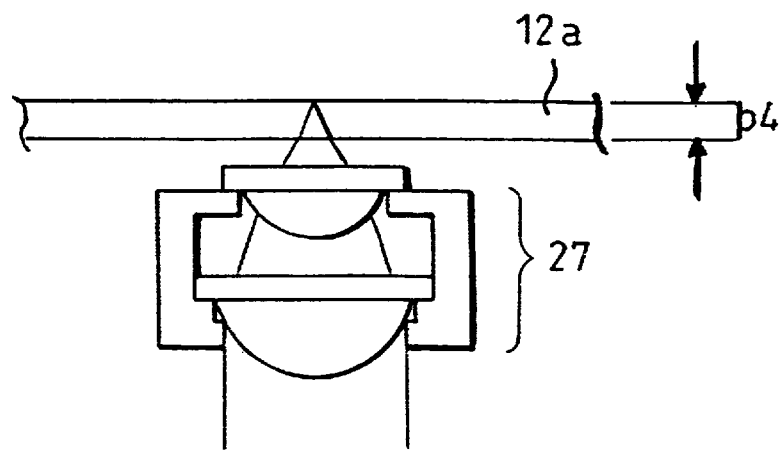
FIG. 12 is an explanatory drawing that shows an objective lens installed in the optical recording/reproducing apparatus of the present invention.

In FIG. 9, two lens-group components in which the lens group gap is adjusted are related not to the objective lens 27, but to a lens-group component 28 constituted by a first lens (lens group) 25 and a second lens (lens group) 26, as described below. The first lens 25 and the second lens 26 are placed with their respective centers being coincident on the light axis of the light source, and the first lens 25 is placed closer to the light source. The first lens 25, which is a plano-concave lens, is placed with its flat face facing the light source side (that is, with its concave face facing the second lens 26 side). Moreover, the second lens 26, which is a plane-convex lens, is placed with its convex face facing the concave face of the first lens 25.

In FIG. 9, divergent light rays, released from a light source 23, are formed into parallel light rays by a collimator lens 24, and made incident on the first lens 25. The resulting divergent light rays through the first lens 25 are made incident on the second lens 26. The light rays released from the second lens 26 are converged on the first recording layer 13 or the second recording layer 14 of the recording medium 11 by the objective lens 27. Here, the objective lens is driven by an FR actuator, no shown. Moreover, the first recording layer 13 and the second recording layer 14 are located at positions respectively having optical thicknesses P3−ΔP and P3+ΔP from the surface of the recording medium 11 on the objective lens side.

Next, an explanation will be given of a correcting process of spherical aberration. The first lens 25 and the second lens 26 are driven by a voice coil motor 9, and when information is recorded/reproduced on/from the first recording layer 13, an applied current +r1 (or −r1) is inputted thereto so as to set the lens gap to h1 (see FIG. 10), and when information is recorded/reproduced on/from the second recording layer 14, an applied current −r2 (or +r2) is inputted thereto so as to set the lens gap to h2 (see FIG. 11). Here, the voice coil motor 9 has basically the same construction as that shown in FIG. 1; therefore, a detailed description thereof is omitted. Additionally, the applied current +r1 or −r1 corresponds to ec1 and the applied current −r2 or +r2 corresponds to ecN respectively in the claims.

Here, the following equation holds:

$$|r1|=|r2|.$$

Moreover, when the applied current is zero, the lens group gap h3 is given as follows:

$$h3=(h1+h2)/2.$$

Additionally, the lens group gap h3 corresponds to dst (3) in the claims.

The objective lens 27 is designed so that, when light rays having no spherical aberration are made incident thereon, the spherical aberration of a light spot which is formed by the light rays transmitted through the light-transmitting layer having an optical thickness of p3−Δp is made smallest; therefore, the first lens 25 and the second lens 26, which are subjected to a correction in the spherical aberration, are preferably designed so that, when the lens group gap is set to h1 (corresponding to DIS(1) disclosed in claims), the spherical aberration of the light rays transmitted through the two lenses is minimized, and when the lens group gap is set to h2 (corresponding to DIS(N) disclosed in claims), the spherical aberration of a light spot that is formed by converging by using the objective lens 27 the light rays released from the second lens 26 and transmitted through a light-transmitting layer having an optical thickness of p3+Δp, that is, the spherical aberration of the converged light spot on the second recording layer 14 is made smaller.

In the case of the arrangement of this type, in the same manner as the arrangement of the aforementioned combination lens, the first lens, the second lens and the objective lens may be designed so that, in response to a change in the gap between the first lens and the second lens, the amount of spherical aberration of the light spot derived from light that has released through the second lens and converged by the objective lens is made to change in a linear fashion, and so that the relationship between the error in the optical thickness of the light-transmitting layer and the spherical aberration is also made to change in a linear fashion. At this time, when the lens group gap is h3, the spherical aberration of the light spot converged at the position having an optical thickness of virtually p3 is minimized by the objective lens 27.

The above-mentioned arrangement makes it possible to reduce the maximum applied current and the power consumption in the spherical-aberration correcting mechanism in the same manner as the combination lens (objective lens) consisting of a plurality of lenses, and also to prevent the operation of the spherical-aberration correcting mechanism from being unstable due to heat generated by the coil, etc. Moreover, since the spherical-aberration correcting mechanism is installed in a manner separated from the objective lens, it is possible to drive the objective lens at higher speeds by the FR actuator.

Figure 13:
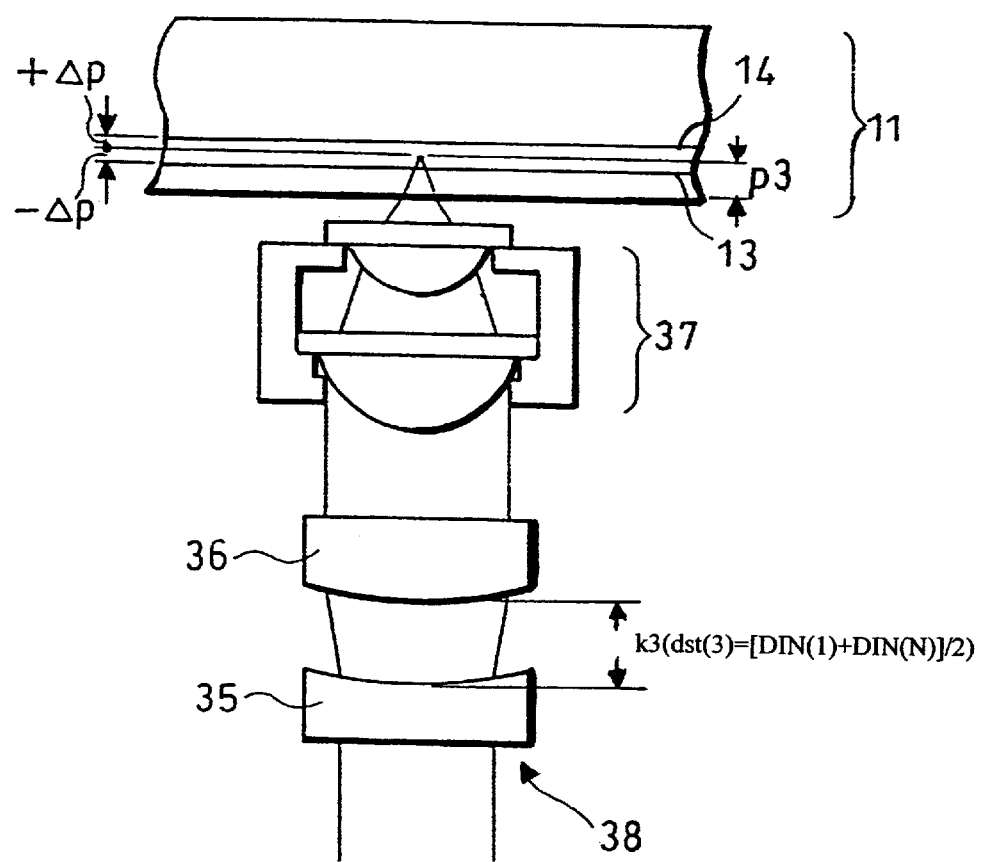
FIG. 13 is an explanatory drawing that shows an arrangement in which spherical aberration is corrected by using a plurality of lenses placed between a light source and an objective lens, in the optical recording/reproducing apparatus of the present invention.
Figure 14:
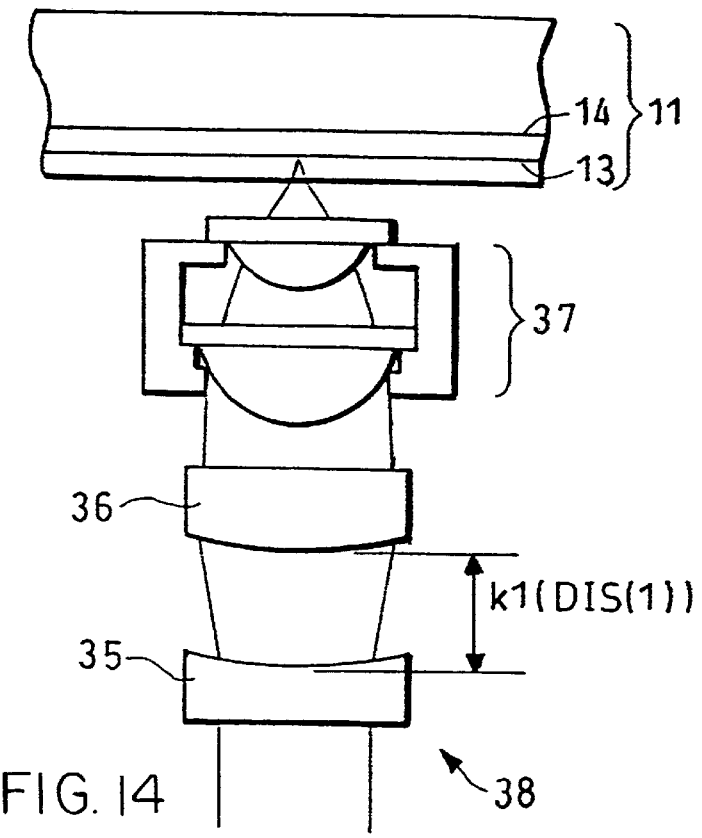
FIG. 14 is an explanatory drawing that shows an operation for correcting spherical aberration in the optical recording/reproducing apparatus of the present invention.
Figure 15:
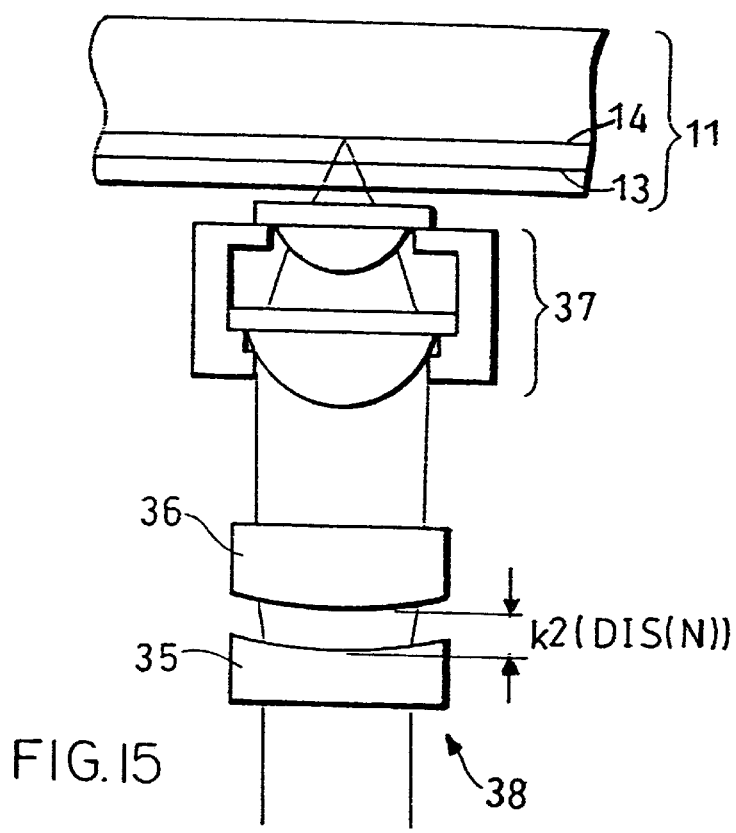
FIG. 15 is an explanatory drawing that shows another operation for correcting spherical aberration in the optical recording/reproducing apparatus of the present invention.

Referring to FIGS. 13 through 15, an explanation will be given of a case in which the objective lens is designed so that, in the case when light rays having virtually no spherical aberration are made incident thereon, the light spot derived from the light rays transmitted through the light-transmitting body 12a having an optical thickness of p4 (see FIG. 12) optically equivalent to the optical thickness p3, that is, the converged light spot at the mid-position between the first recording layer 13 and the second recording layer 14 in the optical recording medium, is allowed to have a minimum spherical aberration. Here, in FIGS. 13 through 15, the two lens group components the gap of which is adjusted are not the objective lens 37, but lens group components 38 consisting of the first lens (lens group) 35 and the second lens (lens group) 36, which will be described below.

In the case when the objective lens 37 of this type is applied, the first lens and the second lens are designed in the following manner: When the lens group gap between the first lens 35 and the second lens 36 is set to k3 (dst (3)), the spherical aberration of light rays transmitted through these two lenses is minimized (FIG. 13); when the lens group gap is set to k1 (DIS(1)), the spherical aberration of the light spot derived from the light rays released from the second lens 36, transmitted through the light-transmitting layer having an optical thickness of p3−Δp and converged by the objective lens 37, that is, the spherical aberration of the converged light spot on the first recording layer 13, is made smaller; and when the lens group gap is set to k2 (DIS(N)), the spherical aberration of the light spot derived from the light rays released from the second lens 36, transmitted through the light-transmitting layer having an optical thickness of p3+Δp and converged by the objective lens 37, that is, the spherical aberration of the converged light spot on the second recording layer 14, is made smaller.

In this case also, in the same manner as the arrangement of the aforementioned combination lens consisting of a plurality of lenses, in response to a change in the gap between the first lens and the second lens, the amount of spherical aberration of the light spot converged by the objective lens is made to change in a linear fashion, and the relationship between the error in the optical thickness of the light-transmitting layer and the spherical aberration is also made to change in a linear fashion; therefore, the lens arrangement that satisfies the above-mentioned conditions can be obtained by a general designing practice.

With the above-mentioned arrangement, since the amounts of spherical aberrations exerted on light spots converged on the first recording layer 13 and the second recording layer 14 are made virtually the same, the sizes of the converged light spots can also be made virtually the same with each other. Consequently, upon carrying out information recording or reproducing on or from the two recording layers, even when switching is made between the recording layers to be reproduced or recorded, it is not necessary to change the number of rotations at which the recording medium is rotated. In other words, it is not necessary to provide dead time for waiting for spindle servo to stand still.

Figure 16:
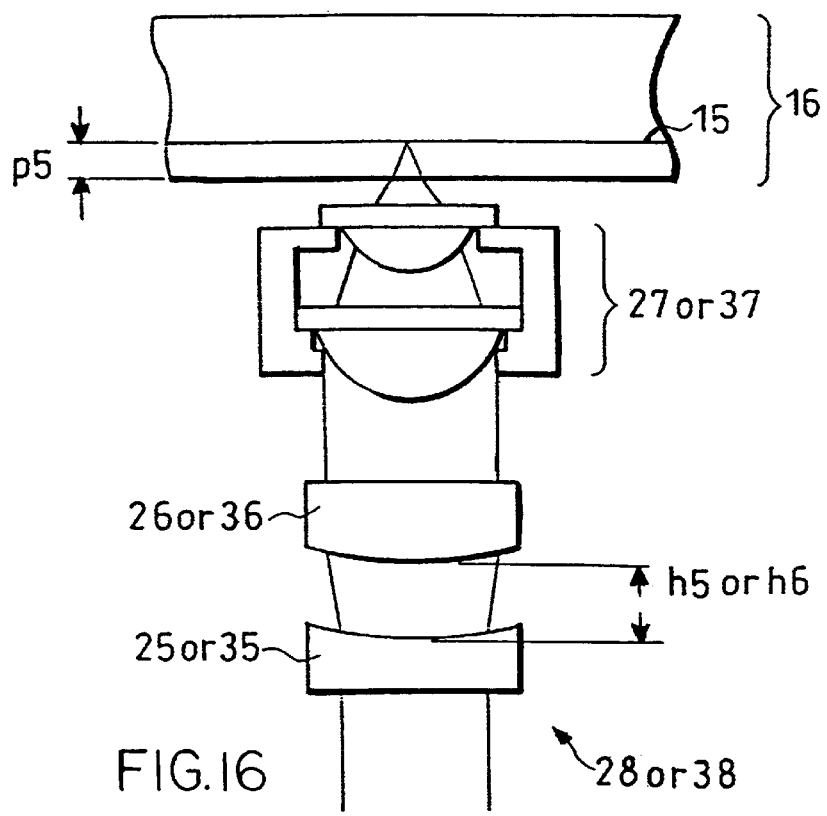
FIG. 16 is an explanatory drawing that shows a state in which recording or reproducing is carried out on a recording medium having a recording layer of a single layer by using an optical recording/reproducing apparatus in accordance with the present invention.
Figure 17:
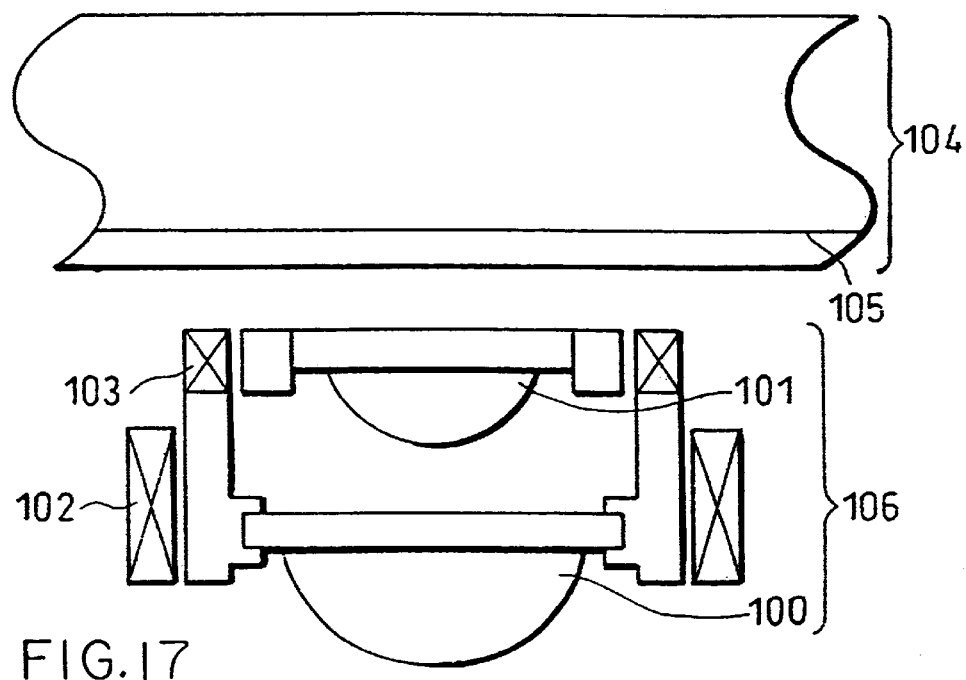
FIG. 17 is an explanatory drawing that shows one example of a combination lens in a conventional technique.

FIG. 16 shows a recording medium 16 having a single recording layer 15, and the optical thickness from the surface of the recording medium 16 on the objective lens side to the recording layer 15 is set to p5. In this arrangement, the optical thickness p3 and the optical thickness p5, shown in FIG. 9, are designed to be virtually coincident with each other. In other words, the lens group gap h5 for correcting the spherical aberration of a light spot converged on the recording layer 15 is virtually coincident with the lens group gap h3 shown in FIG. 9. That is, in the arrangement of FIG. 9, when the lens group gap is set to h3, it is possible to correct the spherical aberration of the light spot converged on the position having an optical thickness of p5 by the objective lens 27, and at this time, the applied current to the spherical-aberration correcting mechanism is maintained at virtually zero.

Moreover, as shown in FIG. 16, for example, the optical thickness p3 and the optical thickness p5, shown in FIG. 13, may be arranged so as to be virtually coincident with each other. In this case, the lens group gap h6 for correcting the spherical aberration of a light spot converged on the recording layer 15 is virtually coincident with the lens group gap k3 shown in FIG. 13. That is, in the arrangement of FIG. 13, when the lens group gap is set to k3, it is possible to correct the spherical aberration of the light spot converged on the position having an optical thickness of p5 by the objective lens 37, and at this time, the applied current to the spherical-aberration correcting mechanism is maintained at virtually zero.

In this arrangement, upon recording or reproducing information on or from the recording medium 16 having a single recording layer, the applied current to be supplied to the spherical-aberration correcting mechanism, that is, a voice coil motor, can be made virtually zero, thereby making it possible to reduce the power consumption. Moreover, it is possible to reduce adverse effects on the optical characteristics due to generation of heat in the coil.

More preferably, an arrangement, shown in FIG. 13, may be used to record/reproduce information on/from the recording medium having a single recording layer. The objective lens, shown in FIG. 13, is designed so that, when light rays having virtually no spherical aberration are made incident thereon, the spherical aberration of the light spot converged on a position having an optical thickness of p3 is made the smallest. Moreover, the first lens 35 and the second lens 36 are designed so that, when the lens group gap is k3, the spherical aberration of light rays released from the second lens 36 is made smallest.

Here, in the recording medium having a single recording layer, by making the optical thickness p5 (see FIG. 16) and the optical thickness p3 (see FIG. 13) virtually coincident with each other, even in the case when information is recorded or reproduced on or from a recording medium having only a single recording layer by using an optical recording/reproducing apparatus for recording/reproducing information on/from a recording medium having two recording layers, it is possible to minimize the spherical aberration of the light spot converged on the recording layer of the recording medium having only a single recording layer. In other words, since the size of the converged light spot is reduced, it is possible to improve the recording density of a recording medium having a single recording layer, and also to reduce the power consumption at the time of recording or reproducing information.

Additionally, the above-mentioned description has exemplified a case in which a plano-concave lens is used as the first lens and a plance-convex lens is used as the second lens; however, the arrangement of the lens is not particularly limited, and a plane-convex lens may be used as the first lens and a plano-concave lens may be used as the second lens. Moreover, two plane-convex lenses may be combined. In other words, the above-mentioned spherical-aberration correcting mechanism may be applied to arrangements generally referred to as beam expander and relay lens. That is, the present invention is applicable to any arrangement as long as it allows the amount of spherical aberration to change by changing the lens group gap.

The above-mentioned embodiment has exemplified a case in which the voice coil motor is used as the spherical-aberration correcting mechanism; however, another mechanism for changing the lens gap by using an electric driving device such as a piezoelectric element may be used with the same effects.

Moreover, another arrangement in which the gap between a collimator lens and a light source is changed by the spherical-aberration correcting mechanism may be adopted; and in this case, the neutral point of the spherical-aberration correcting mechanism is set at a point which allows the focal distance of the collimator lens and the gap between the collimator lens and the light source to coincide with each other.

Furthermore, an explanation has been given of the combination lens consisting of two lenses; however, the same effects are obtained also in the case when the spherical aberration is corrected by changing the lens gap between a first group of lenses and a second group of lenses that include a number of lenses.

Moreover, the present embodiment has exemplified a recording medium having two recording layers; however, the same effects are obtained even in the case of a recording medium having more recording layers (not less than three).

Furthermore, with respect to the recording medium having a plurality of recording layers, the above-mentioned description has exemplified a case in which a light-transmitting layer, a plurality of recording layers, a light-transmitting layer interpolated between the recording layers and a substrate layer are stacked in succession from the combined lens side; however, a so-called joined disk having two of such recording media joined to each other may be used with the same effects. In this case, however, recording and reproducing processes have to be carried out from both of the sides of the recording medium. Moreover, with respect to a recording medium having a single recording layer, a joined disk of such recording media may be used.

Furthermore, with respect to the recording layer, the same effects can be obtained by the application of any of those read-only type, write once type and re-writable type.

Here, with respect to the optical thickness from the surface of the recording medium on the lens side to the recording layer, it is possible to define it by using values of the refractive index and the thickness of the surface of the recording medium on the lens side to the recording layer (for example, a thickness measured by focusing the objective lens to each layer), and upon designing the recording medium, these values are also set within predetermined ranges. In other words, in both of the recording layer of the recording medium having a single recording layer and the first recording layer, . . . , the N-numbered recording layer of the recording medium having a plurality of recording layers, the refractive index and the thickness of the surf ace of the recording medium on the lens side to the recording layer are set in predetermined ranges. That is, it can be said that the optical thickness is maintained within a predetermined range.

The following description will discuss the above-mentioned case. First, in the present invention, the optical thickness of a recording medium having a plurality of recording layers is defined as follows: When it is assumed that a refractive index n1 and a thickness s1, which are a predetermined refractive index and a thickness located within the thickness from the surface of the recording medium on the lens side to the recording layer, are the refractive index and the thickness of the first recording layer, while assuming that a lens gap is d1 (h1), the lens gap being obtained at the time of forming a converged light spot by a combination lens (or an objective lens and two lens groups) on the first recording layer having the refractive index n1 and the thickness s1, and when it is also assumed that a refractive index n2 and a thickness s2, which are a predetermined refractive index and a thickness located within the thickness from the surface of the recording medium on the lens side to the recording layer, are the refractive index and the thickness of the N-th recording layer, while assuming that a lens gap is d2 (h2), the lens gap being obtained at the time of forming a converged light spot by a combination lens (or an objective lens and two lens groups) on the N-th recording layer having the refractive index n2 and the thickness s2, the optical thickness is defined by both of the first recording layer having the refractive index n1 and the thickness s1 and the N-th recording layer having the refraction index n2 and the thickness s2 that make the difference between d1 and d2 (difference between h1 and h2) the greatest.

Moreover, a light-transmitting layer is located between a recording layer and another recording layer in the proximity of said recording layer, and the optical thickness from the surface of the recording medium on the lens side to the first recording layer and the optical thickness (refractive index and thickness) of the light-transmitting layer between these recording layers is sometimes different; however, in such a case, the optical thickness from the surface of the recording medium on the lens side to the first recording layer and the optical thickness of the light-transmitting layer between the recording layers may be combined, and based upon the above-mentioned idea, the lens group gap may be determined.

As described above, the optical recording/reproducing apparatus of the present invention, which records/reproduces information on/from a recording medium having recording layers the number of which is represented by N ($N \geq 2$) by converging light rays from a light source thereon, is provided with: two lens groups, each including at least one lens, placed in a light path from the light source to the recording medium; and a spherical-aberration correcting mechanism which changes a lens group gap between the two groups by means of electrical driving so as to correct spherical aberration of a converged light spot formed on each of the recording layers, wherein, supposing that the recording layers having N number of layers are a first recording layer, . . . , an N-th recording layer, the lens group gap is represented by DIS(1) at the time of correcting the spherical aberration of the converged light spot formed on the first recording layer, and the intensity of an applied current to the spherical-aberration correcting mechanism is ecN, said spherical-aberration correcting mechanism is operated so as to satisfy a relationship:

$$|ec1|=|ecN|,$$

and when the lens group gap is set to a dst(3) that satisfies dst(3)=(DIS(1)+DIS(N))/2, the size of the applied current to the spherical-aberration correcting mechanism is set to zero.

Moreover, in the optical recording/reproducing apparatus of the present invention, the two groups of lenses constitute an objective lens for converging light rays from the light source onto the recording medium, the two groups of lenses forming the objective lens are set in such a manner that, when the lens group gap is d4, a light spot derived from light rays transmitted through a light-transmitting body having an optical thickness is t4 has a minimum spherical aberration, and the lens group gap d4 and the dst (3) are set so as to be virtually the same.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A low power consumption optical recording/reproducing apparatus, which records/reproduces information on/from a recording medium having recording layers, the number of which is represented by N (N≧2), by converging light rays from a light source thereon, comprising:

two lens groups, each including at least one lens, placed in a light path from the light source to the recording medium; and a spherical-aberration correcting mechanism which changes a lens group gap between the two groups by means of electrical driving so as to correct spherical aberration of a converged light spot formed on one of the recording layers, wherein, the N number of recording layers comprise a first recording layer through an Nth recording layer respectively disposed in succession from the lens group side, (i) the lens gap is represented by DIS(1) and the intensity of an applied current to the spherical-aberration correcting mechanism is represented by ec1 when the spherical aberration of the converged light spot formed on the first recording layer is being corrected, (ii) the lens group gap is represented by DIS(N) and the intensity of an applied current to the spherical-aberration correcting mechanism is represented by ecN when the spherical aberration of the converged light spot formed on the Nth recording layer is being corrected, (iii) said spherical-aberration correcting mechanism is operated so as to satisfy a relationship:

$|ec1|=|ecN|$, and (iv) a lens group gap dst (3) satisfies the following relationship:

$dst(3)=[DIS(1)+DIS(N)]/2$, when the applied current intensity to the spherical-aberration correcting mechanism is zero.

2. The optical recording/reproducing apparatus as defined in claim 1, wherein the two lens groups constitute an objective lens for converging light rays from the light source onto the recording medium.

3. The optical recording/reproducing apparatus as defined in claim 2, wherein the two lens groups constitute an objective lens and are designed so that, when the lens group gap is d4, a light spot derived from light rays transmitted through the light-transmitting body having an optical thickness of t4 has a minimum spherical aberration, and wherein the optical thickness capable of correcting the spherical aberration at the time the lens group gap dst(3) is t3, t3 and t4 are virtually coincident with each other, and two recording layers of the recording medium, located at positions having optical thicknesses from the surface on the lens group side t3+Δt and t3−Δt respectively have virtually the same recording density.

4. The optical recording/reproducing apparatus as defined in claim 1, further comprising:

an objective lens for converging light rays from the light source onto the recording medium, and wherein the two groups of lenses are placed between the light source and the objective lens.

5. The optical recording/reproducing apparatus as defined in claim 4, wherein:

the objective lens is set so that a light spot, derived from light rays transmitted through a light-transmitting body having an optical thickness p4 and converged, has a minimum spherical aberration, the two lens groups are set so that, when virtually parallel light rays are made incident thereon and the lens group gap is dst(3), the spherical aberration of the released light rays is minimized, the optical thickness capable of correcting the spherical aberration when the lens group gap dst(3) is p3, p3 and p4 are virtually coincident with each other, and two recording layers of the recording medium, located at positions having optical thicknesses from the surface on the lens group side p3+Δp and p3−Δp have virtually the same recording density.

6. The optical recording/reproducing apparatus as defined in claim 4, wherein the two lens groups are constituted by a plano-concave and a plane-convex lens.

7. The optical recording/reproducing apparatus as defined in claim 1, wherein a voice coil motor is provided as the spherical-aberration correcting mechanism.

8. A low power consumption optical recording/reproducing apparatus, which records/reproduces information on/from a recording medium having at least one recording layer, comprising:

a light source;

two lens groups, each including at least one lens, placed in a light path from the light source to the recording medium; and a spherical-aberration correcting mechanism which changes a lens group gap between said two lens groups by means of electrical driving so as to correct spherical aberration of a converged light spot formed on one of the recording layers, wherein, when the recording medium has a number of recording layers represented by N (N≧2) comprising a first recording layer through an N-th recording layer respectively disposed in succession from the lens group side, (i) the lens group gap is represented by DIS(1) and the intensity of an applied current to the spherical-aberration correcting mechanism is represented by ec1 when a spherical aberration of a converged light spot formed on the first recording layer is being corrected, (ii) the lens group gap is represented by DIS(N) and the intensity of an applied current to the spherical-aberration correcting mechanism is represented by ecN when a spherical aberration of a converged light spot formed on the N-th recording layer is being corrected (iii) said spherical-aberration correcting mechanism is operated so as to satisfy the relationship:

$|ec1|=|ecN|$, and (iv) a lens group gap dst(3) satisfies the following relationship:

$$dst(3) = [DIS(1) + DIS(N)]/2,$$

when the applied current to the spherical-aberration correcting mechanism is zero, and wherein when the recording medium has only a single layer, the actual optical thickness of the recording layer and an optical thickness of a recording layer having a correctable spherical-aberration are made virtually coincident with each other when the applied current to the spherical-aberration correcting mechanism is zero.

9. A method for recording/reproducing information by using a low power consumption recording/reproducing apparatus, comprising:

a light source;

two lens groups, each including at least one lens, placed in a light path from the light source to the recording medium; and a spherical-aberration correcting mechanism which changes a lens group gap between said two lens groups by means of electrical driving so as to correct spherical aberration of a converged light spot formed on one of the recording layers, wherein, when the recording medium has a number of recording layers represented by N (N≧2) comprising a first recording layer through an N-th recording layer respectively disposed in succession from the lens group side, (i) the lens group gap is represented by DIS(1) and the intensity of an applied current to the spherical-aberration correcting mechanism is represented by ec1 when a spherical aberration of a converged light spot formed on the first recording layer is being corrected, (ii) the lens group gap is represented by DIS(N) and the intensity of an applied current to the spherical-aberration correcting mechanism is represented by ecN when a spherical aberration of a converged light spot formed on the N-th recording layer is being corrected, (iii) said spherical-aberration correcting mechanism is operated so as to satisfy the relationship:

$$|ec1| = |ecN|,$$

and (iv) a lens group gap dst(3) satisfies the following relationship:

$$dst(3) = [DIS(1) + DIS(N)]/2,$$

when the applied current to the spherical-aberration correcting mechanism is zero, and wherein when the recording medium has only a single layer, the actual optical thickness of the recording layer and an optical thickness of a recording layer having a correctable spherical-aberration are made virtually coincident with each other when the applied current to the spherical-aberration correcting mechanism is zero.

* * * * *